United States Patent
Lynch et al.

(10) Patent No.: US 9,396,234 B2
(45) Date of Patent: Jul. 19, 2016

(54) EVENT MONITORING FOR COMPLEX EVENT PROCESSING

(75) Inventors: Edward Michael Lynch, Toronto (CA);
Stephen J. Lyons, Bedford, MA (US);
Jared Michael Michalec, Denver, CO (US); Victor S. Moore, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/474,976

(22) Filed: May 29, 2009

(65) Prior Publication Data

US 2010/0306709 A1 Dec. 2, 2010

(51) Int. Cl.
*G06F 3/00* (2006.01)
*G06F 17/30* (2006.01)
*G06F 3/01* (2006.01)

(52) U.S. Cl.
CPC .............................. *G06F 17/30516* (2013.01)

(58) Field of Classification Search
USPC ............ 715/734, 736–740, 854, 742; 714/39, 714/E11.024; 719/318, 313, 314
See application file for complete search history.

(56) References Cited

U.S. PATENT DOCUMENTS

| | | | |
|---|---|---|---|
| 5,447,164 A * | 9/1995 | Shaya et al. | 600/523 |
| 5,857,190 A * | 1/1999 | Brown | |
| 6,385,412 B1 * | 5/2002 | Sadakuni | 399/75 |
| 7,590,606 B1 * | 9/2009 | Keller et al. | 706/45 |
| 7,685,605 B1 * | 3/2010 | Ahmed | G06F 9/542 |
| | | | 709/203 |
| 2004/0093510 A1 * | 5/2004 | Nurmela | G06F 21/55 |
| | | | 726/23 |
| 2006/0095853 A1 * | 5/2006 | Amyot et al. | 715/744 |
| 2006/0253790 A1 * | 11/2006 | Ramarajan | G06Q 10/00 |
| | | | 715/764 |
| 2007/0255529 A1 * | 11/2007 | Biazetti et al. | 702/186 |
| 2009/0044171 A1 * | 2/2009 | Avadhanula | G06F 8/20 |
| | | | 717/105 |
| 2009/0192965 A1 * | 7/2009 | Kass | G06F 17/30539 |
| | | | 706/46 |
| 2009/0210364 A1 * | 8/2009 | Adi et al. | 706/12 |
| 2009/0265336 A1 * | 10/2009 | Suntinger et al. | 707/5 |
| 2014/0157195 A1 * | 6/2014 | Bowman | H04L 29/06027 |
| | | | 715/810 |

OTHER PUBLICATIONS

"IBM WebSphere Business Events enables users to manage business events, flowing across systems and people, to deliver sense and react capabilities with actionable business insights"; IBM United States Announcement 208-070; Apr. 1, 2008.

(Continued)

*Primary Examiner* — Toan Vu
(74) *Attorney, Agent, or Firm* — Steven M. Greenberg, Esq.; CRGO Law

(57) ABSTRACT

Embodiments of the present invention provide a method, system and computer program product for an event monitoring tool configured for complex event processing (CEP). In one embodiment, a data processing system can include a CEP event monitoring tool configured for coupling to touch points over a network and a repository of a log of events occurring in the touch points. A dashboard can be displayed by the tool and can include a canvas view of events, associated interaction blocks each including filter criteria for associated events, and at least one activity triggered by an evaluation of at least one of the filter criteria in at least one of the interaction blocks for a corresponding one of the touch points. The canvas view further can include visual links between the events and the associated interaction blocks and between the activity and an interaction block amongst the interaction blocks triggering the activity.

14 Claims, 2 Drawing Sheets

(56) References Cited

OTHER PUBLICATIONS

"IBM WebSphere Business Events and now WebSphere Business Events eXtreme Scale extend business event processing to manage large volumes of events for insightful action"; IBM United States Announcement 208-295; Oct. 1, 2008.
"WebSphere Business Events—Getting Started Guide"; Version 6.1; Second Edition; Aug. 2008.

* cited by examiner

EVENT MONITORING FOR COMPLEX EVENT PROCESSING

BACKGROUND OF THE INVENTION

1. Field of the Invention

The present invention relates to the field of event stream processing for business process management (BPM) and more particularly to event monitoring tools configured for visualizing complex event processing (CEP).

2. Description of the Related Art

Event Stream Processing (ESP) relates to a set of technologies designed to assist the construction of event-driven information systems. ESP technologies include event visualization, event databases, event-driven middleware, and event processing languages, or CEP. ESP long has enabled Internet-age applications including algorithmic trading in financial services, radio frequency identification (RFID) event processing in retail, inventory management and logistics, fraud detection for merchant and financial services, process monitoring, and location-based services in telecommunications.

Complex Event Processing (CEP) is an emerging form of ESP intended for use in building and managing information systems including (1) Business Activity Monitoring; (2) Business Process Management; (3) Enterprise Application Integration; (4) Event-Driven Architectures; (5) Network and business level Security; and (6) Real time conformance to regulations and policies. CEP embodies principles for building applications that enable enterprises to keep pace with the information flowing through respective information technology (IT) systems. CEP is primarily an event-processing concept addressing the task of processing multiple events in order to identify meaningful events within an event cloud. To that end, CEP employs techniques such as detection of complex patterns of many events, event correlation and abstraction, event hierarchies, and relationships between events such as causality, membership, and timing, and event-driven processes.

The goal of CEP is to enable the information contained in the events flowing through all layers of the enterprise IT infrastructure to be discovered, understood in terms of its impact on high level management goals and business processes, and acted upon in real time. The events handled by CEP include not only software driven events, but also events originating in hard sensors, such as those prevalent in technologies such as RFID. At present, CEP principally complements and contributes to technologies such as service oriented architecture (SOA), event driven architecture (EDA) and business process management (BPM).

Generally, the conventional event monitoring tool parses event logs in order to apply CEP to event information contained in the logs. Specifically, within the event monitoring tool, end users define business event logic including interaction sets, composed of interaction blocks, that orchestrate business processes between monitored systems or applications, known as touch points. The interaction blocks each include one or more event filters and corresponding actions associated with a received event. An event filter provides a condition that when evaluated with respect to the associated event can trigger a corresponding action. An interaction set, in turn, is a collection of interaction blocks all associated with the same event. Finally, an action identifies an activity that will occur in a touch point when one or more rules in an interaction set evaluate true.

In operation, a run-time portion of the event monitoring tool obtains events from a message queue placed on the queue by event connectors, evaluates those events against the business event logic defined in interaction sets, and places actions on the message queue to be utilized by action connectors and passed to the associated touch points so that the appropriate actions can be performed. Of note, a dashboard view can be provided within the tool. The dashboard view provides a visual rendering of activities occurring in one or more touch points. The dashboard view, however, only provides an indication of activity counts in a touch point. The dashboard view lacks the display richness requisite to show activities across independent interactions and the flexibility to analyze specific streams, or common data fields in different events.

BRIEF SUMMARY OF THE INVENTION

Embodiments of the present invention address deficiencies of the art in respect to enabled event monitoring tools and provide a novel and non-obvious method, system and computer program product for an event monitoring tool configured for CEP. In an embodiment of the invention, a data processing system can be configured for CEP event monitoring with a filtered canvas view of an event flow. The system can include a CEP event monitoring tool executing by a processor in memory of a host server. The CEP event monitoring tool further can be configured for coupling to different touch points over a computer communications network—namely different monitored systems and applications, including different monitored computers, computer components, and external sensors. The system also can include a repository coupled to the CEP event monitoring tool, the repository including a log of events occurring in the touch points.

Of note, a dashboard can be programmatically displayed by the CEP event monitoring tool. The dashboard can include a canvas view of events, associated interaction blocks each of the interaction blocks comprising filter criteria for associated ones of the events, and at least one activity triggered by an evaluation of at least one of the filter criteria in at least one of the interaction blocks for a corresponding one of the touch points. The canvas view further can include visual links between the events and the associated interaction blocks and between the activity and an interaction block amongst the interaction blocks triggering the activity. In an aspect of the embodiment, the canvas view can be a filtered canvas view filtering the events, interaction blocks and activities according to a common context for the events specified through the dashboard.

In another embodiment of the invention, a method of rendering a filtered canvas view of an event flow in a data processing system configured for CEP event monitoring can be provided. The method can include receiving a context identifier through a dashboard displayed in a computer for a CEP event monitoring tool executing in memory by a processor of a host server. The method also can include filtering events in a log of events for monitored touch points communicatively coupled to the CEP event monitoring tool according to the context identifier. The method yet further can include displaying in a filtered canvas view disposed within the dashboard the filtered events and associated interaction blocks defined within the CEP event monitoring tool and at least one activity triggered by an evaluation of at least one filter criteria of a least one associated interaction block. Finally, the method can include visually linking the filtered events and associated interaction blocks, and the at least one activity and the at least one associated interaction block in the filtered canvas view.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for CEP event monitoring with a filtered canvas view of an event flow. In accordance with an embodiment of the present invention events with associated contexts can be monitored for touch points in a data processing system. Filters defined for established interaction blocks of different interaction sets for the events can be applied to produce one or more activities in the touch points. A canvas can be rendered in a CEP event monitoring tool for the data processing system to include events graphically linked to different interaction blocks for the events and at least one of the interaction blocks can be graphically linked to a resulting activity. An indication of an occurrence of each event rendered in the canvas can be displayed in connection with a corresponding event. Further, an evaluation state, such as true, false or not yet determinable, of each filter in each of the interaction blocks can be displayed in connection with a corresponding filter.

Of note, the display of the events, interaction blocks and activities in the canvas can be filtered according to a common context for each of the events, interaction blocks and activities. In this way, a singular viewing of the canvas can provide relevant information with respect to the CEP event monitoring of the data processing system. The relevant information can include which events have occurred and which events have not occurred, how many times each event has occurred within a given time period, which filters have evaluated to false and causally, how an activity performed on a touch point has occurred by way of an evaluation of one or more filters on one or more occurrences of one or more events.

Figure 1:
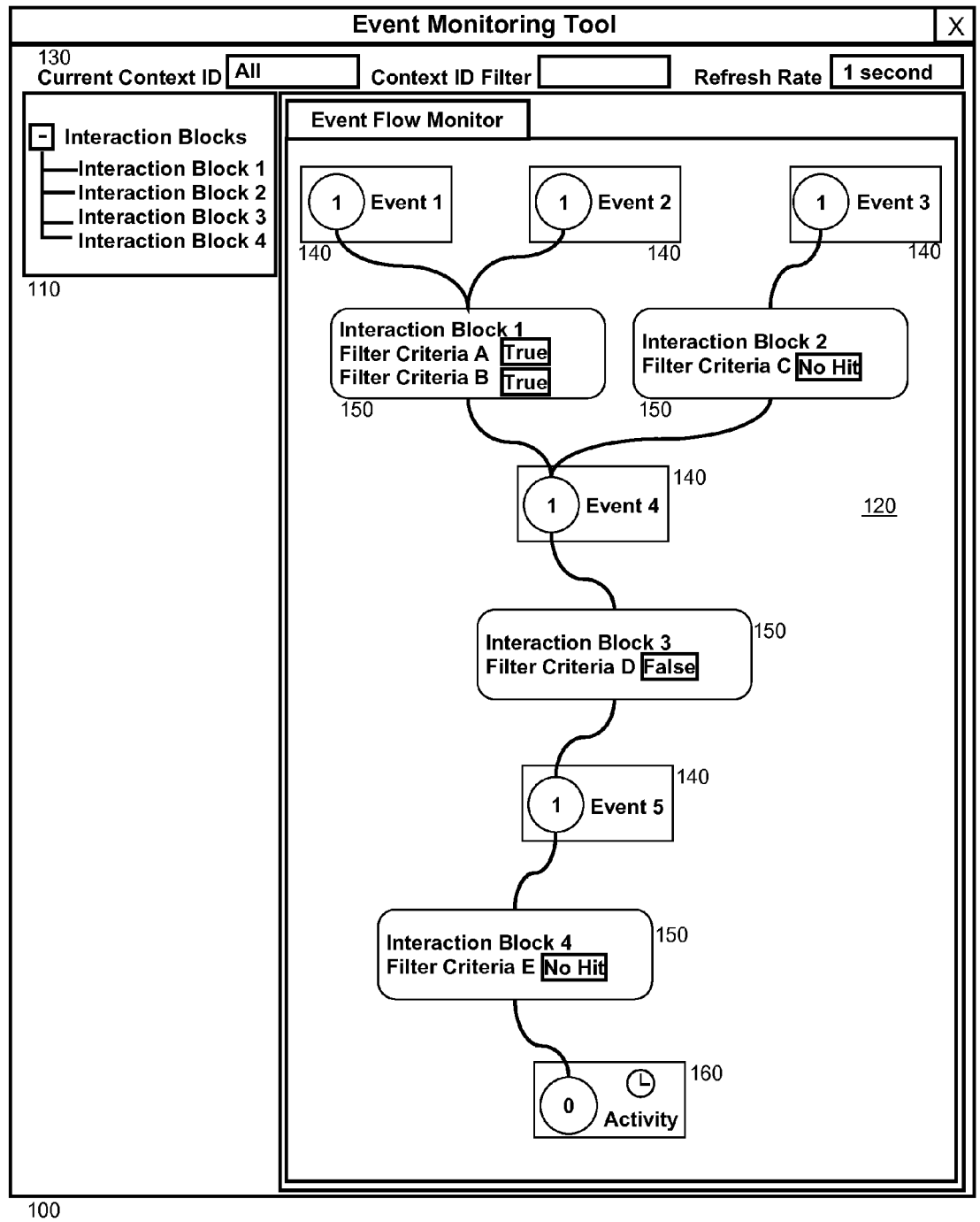
FIG. 1 is a screen shot of a user interface for an CEP event monitoring tool with a filtered canvas view of an event flow.

In further illustration, FIG. 1 is a screen shot of a user interface for a CEP event monitoring tool with a filtered canvas view of an event flow. As shown in FIG. 1, a graphical user interface (GUI) 100 for a CEP event monitoring tool can be provided. The GUI 100 can include each of a selectable hierarchy 110 of interaction blocks defined for different touch points of a data processing system, and a filtered canvas view 120 of events 140, interaction blocks 150 and activities 160 occurring for one or more of the touch points. The GUI 100 also can include filter controls 130 through which filters can be applied to the filtered canvas view 120—namely a context and a refresh rate. The context, in this regard, can include data common to the different events 140 displayed in the filtered canvas view 120 such as a common customer, customer number, vendor or vendor number, to name only few non-limiting examples. By applying a specific context through the filter controls 130, only those events 140 and associated interaction blocks 150 and activities 160 sharing the specified context can be rendered in the filtered canvas view 120.

Importantly, the events 140 in the filtered canvas view 120 can be visually linked to associated interaction blocks 150, each with one or more filter criteria. The visual links can include lines drawn connecting the events 140 to the associated interaction blocks 150. Further, the interaction blocks 150 rendered in the filtered canvas view 120 can be visually linked to others of the events 140, or resulting activities 160 for applicable touch points in the data processing system. Additionally, each of the events 140 can include a visual indication of a number of occurrences of a corresponding one of the events 140. Yet further, each of the filter criteria in the interaction blocks 150 can include both a visual indication of a current state of evaluation, such as true, false, or not yet determinable, and also whether a given one of the filter criteria has been programmatically configured to evaluate within specific time threshold. Finally, each of the activities 160 can provide both a visual indication of a number of times the activity 160 has been triggered and also a visual indication such as a clock indicating whether or not the activity 160 is programmatically scheduled to occur within a specified period of time.

The selectable hierarchy 110 can include a tree view of interaction blocks established for the touch points of the data processing system. In this regard, each interaction block listed in the selectable hierarchy 110 can be configured to respond to a selection thereof by directing the rendering of the filter criteria for the selected interaction block in the filtered canvas view 120. The display of the selected interaction block in the filtered canvas view 120 can include not only the filter criteria for the selected interaction block, but also an indication of a current state of evaluation for each of the filter criteria and also a visual indication of whether a given one of the filter criteria has been programmatically configured to evaluate within specific time threshold.

Figure 2:
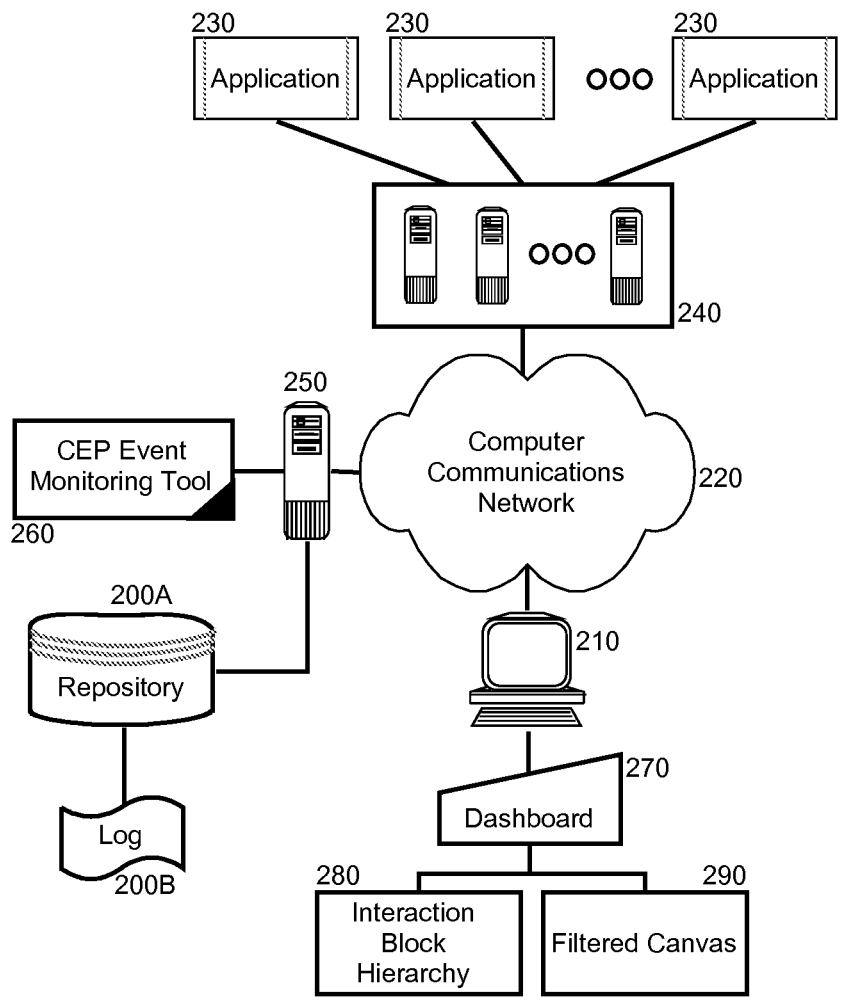
FIG. 2 is a schematic illustration of a data processing system configured for CEP event monitoring with a filtered canvas view of an event flow; and, FIG. 3 is a flow chart illustrating a process for rendering a filtered canvas view of an event flow in a data processing system configured for CEP event monitoring.

The GUI 100 of FIG. 1 can be generated in connection with the monitoring of a data processing system configured for CEP event monitoring. In yet further illustration, FIG. 2 schematically depicts a data processing system configured for CEP event monitoring with a filtered canvas view of an event flow. The system can include a host computer 210 with processor and memory communicatively coupled over a computer communications network 220 to a host server 250 and one or more monitored computing systems 240 supporting one or more monitored applications 230 (collectively, the touch points). The host server 250 can support the execution of a CEP event monitoring tool 260 executing by a processor in the memory of the host server 250 and collecting and processing events from the touch points of the applications 230 and computing systems 240 in a log 200B disposed within a coupled repository 200A. The host computer 210, in turn, can include a dashboard 270 displayed by the processor of the host computer 210 in connection with the CEP event monitoring tool 260. Notably, the dashboard 270, acting as the GUI for the CEP event monitoring tool 260, can include both a selectable hierarchy of interaction blocks 280 and a filtered canvas view 290.

The selectable hierarchy of interaction blocks 280 can provide a display of individually selectable interaction blocks applicable to one or more events in the log 200B in the repository 200A. The filtered canvas view 290, in turn, can include a display of a rendering of different events, interaction blocks and activities sharing a common context specified for the filtered canvas view 290 through the dashboard 270. Importantly, the events, interaction blocks and activities rendered in the filtered canvas view 290 can be visually linked to one another according to a causal relationship between the events and the filter criteria of the interaction blocks, and the activities applied to the touch points in consequence of the evaluation of the events by the interaction blocks.

The CEP event monitoring tool 260 can include program code which when executed by a processor in the memory of the host server 250 can perform CEP of the events in the log 200B of the repository 200A in order to evaluate established filter criteria of interaction blocks associated with the events. The evaluation of the established filter criteria can lead to the triggering of one or more actions on corresponding ones of the touch points. Significantly, the program code of the CEP event monitoring tool 260 can be enabled to display a real-time or near real-time view of the state of different events and associated interaction blocks and resulting activities for corresponding touch points in the filtered canvas view 290 of the dashboard 270.

Figure 3:
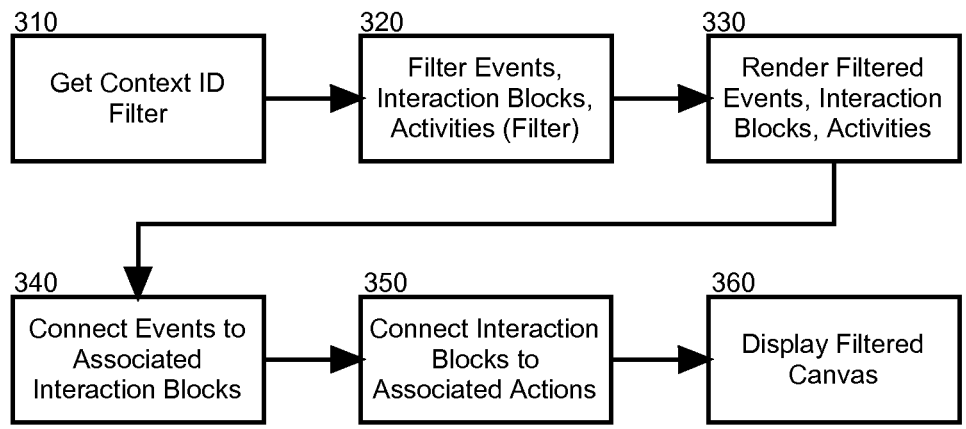

In even yet further illustration of the operation of the program code of the CEP event monitoring tool 260, FIG. 3 is a flow chart illustrating a process for rendering a filtered canvas view of an event flow in a data processing system configured for CEP event monitoring. Beginning in block 310, a context identifier can be received through the dashboard and in block 320, the events in the log sharing in common the context identifier can be filtered from other events in the log, along with the interaction blocks and activities established for the filtered events.

In block 330, the filtered events, interaction blocks and activities can be rendered in the filtered canvas view of the dashboard. Notably, in block 340, different ones of the events can be visually linked to associated interaction blocks having filter criteria associated with the events. Further, in block 350 activities triggered by an evaluation of the interaction blocks can be visually linked to the interaction blocks triggering the activities. Finally, in block 360 the filtered canvas view can be displayed in the dashboard.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system configured for complex event processing (CEP) event monitoring with a filtered canvas view of an event flow, the system comprising:

a CEP event monitoring tool executing by a processor in memory of a host server and configured for coupling to a plurality of touch points over a computer communications network;

a repository coupled to the CEP event monitoring tool, the repository comprising a log of events occurring in the touch points;

a dashboard programmatically displayed by the CEP event monitoring tool, the dashboard comprising a canvas view of events, associated interaction blocks, each of the interaction blocks comprising filter criteria for associated ones of the events, and at least one activity triggered by an evaluation of at least one of the filter criteria in at least one of the interaction blocks for a corresponding one of the touch points, each event in the canvas view further comprising a visual indication indicating a number of occurrences of a corresponding event visually disposed adjacent to the corresponding event, the canvas view further comprising visual links between the events and the associated interaction blocks and between the activity and an interaction block amongst the interaction blocks triggering the activity, wherein for a selected activity rendered in the canvas view, both a visual indication indicating a number of times the selected activity has been triggered is visually disposed adjacent to the selected activity and also a visual indication indicating whether or not the selected activity is programmatically scheduled to occur within a specific period of time is also visually disposed adjacent to the selected activity.

2. The system of claim 1, wherein the canvas view is a filtered canvas view filtering the events, interaction blocks and activities according to a common context for the events specified through the dashboard.

3. The system of claim 1, wherein the dashboard further comprises a selectable hierarchy of interaction blocks separate from the canvas view.

4. The system of claim 1, further comprising for each filter criteria for each interaction block rendered in the canvas view, a visual indication visually disposed adjacent to a corresponding filter criteria of a current state of the corresponding filter criteria.

5. The system of claim 4, wherein the current state of the corresponding filter criteria is selected from the group consisting of true, false, and not yet determinable.

6. The system of claim 1, further comprising for a selected one of the filter criteria, a visual indication, visually disposed adjacent to the selected one of the filter criteria in a corresponding interaction block, of whether the selected one of the filter criteria has been programmatically configured to evaluate within a specific time threshold.

7. A method of rendering a filtered canvas view of an event flow in a data processing system configured for complex event processing (CEP) event monitoring, the method comprising:
   receiving a context identifier through a dashboard displayed in a computer for a CEP event monitoring tool executing in memory by a processor of a host server;
   filtering events in a log of events for monitored touch points communicatively coupled to the CEP event monitoring tool according to the context identifier;
   displaying in a filtered canvas view disposed within the dashboard, the filtered events and associated interaction blocks defined within the CEP event monitoring tool and at least one activity triggered by an evaluation of at least one filter criteria of at least one associated interaction block;
   visually linking the filtered events and associated interaction blocks, and the at least one activity and the at least one associated interaction block in the filtered canvas view; and,
   additionally displaying adjacent to a corresponding filtered event in the filtered canvas view for each filtered event, a visual indication indicating a number of occurrences of a corresponding filtered event and also additionally displaying adjacent to a corresponding activity of the at least one activity for each of the at least one activity, both a visual indication indicating a number of times the corresponding activity has been triggered and also a visual indication indicating whether or not the corresponding activity is programmatically scheduled to occur within a specific period of time.

8. The method of claim 7, further comprising additionally displaying adjacent to a filter criteria in a corresponding interaction block in the filtered canvas view for each filter criteria in the corresponding interaction block, a current state for the filter criteria.

9. The method of claim 8, wherein the current state for the filter criteria is selected from the group consisting of true, false, and not yet determinable.

10. The method of claim 7, further comprising additionally displaying, in a corresponding interaction block in the filtered canvas view for each interaction block in the filtered canvas view, a visual indication indicating whether a corresponding filter criteria has been programmatically configured to evaluate within a specific time threshold.

11. A computer program product comprising a non-transitory computer usable storage medium storing computer usable program code for rendering a filtered canvas view of an event flow in a data processing system configured for complex event processing (CEP) event monitoring, the computer program product comprising:
   computer usable program code for receiving a context identifier through a dashboard displayed in a computer for a CEP event monitoring tool executing in memory by a processor of a host server;
   computer usable program code for filtering events in a log of events for monitored touch points communicatively coupled to the CEP event monitoring tool according to the context identifier;
   computer usable program code for displaying in a filtered canvas view disposed within the dashboard the filtered events and associated interaction blocks defined within the CEP event monitoring tool and at least one activity triggered by an evaluation of at least one filter criteria of a least one associated interaction block;
   computer usable program code for visually linking the filtered events and associated interaction blocks, and the at least one activity and the at least one associated interaction block in the filtered canvas view; and,
   computer usable program code for additionally displaying adjacent to a corresponding filtered event in the filtered canvas view for each filtered event, a visual indication indicating a number of occurrences of a corresponding filtered event and also computer usable program code for additionally displaying adjacent to a corresponding activity of the at least one activity for each of the at least one activity, both a visual indication indicating a number of times the corresponding activity has been triggered and also a visual indication indicating whether or not the corresponding activity is programmatically scheduled to occur within a specific period of time.

12. The computer program product of claim 11, further comprising computer usable program code for additionally displaying adjacent to a filter criteria in a corresponding interaction block in the filtered canvas view for each filter criteria in the corresponding interaction block, a current state for the filter criteria.

13. The computer program product of claim 12, wherein the current state for the filter criteria is selected from the group consisting of true, false, and not yet determinable.

14. The computer program product of claim 11, further comprising computer usable program code for additionally displaying, in a corresponding interaction block in the filtered canvas view for each interaction block in the filtered canvas view, a visual indication indicating whether a corresponding filter criteria has been programmatically configured to evaluate within a specific time threshold.

* * * * *